United States Patent
Cho et al.

(10) Patent No.: US 11,619,217 B2
(45) Date of Patent: Apr. 4, 2023

(54) HERMETIC COMPRESSOR

(71) Applicant: LG ELECTRONICS INC., Seoul (KR)

(72) Inventors: Hangjun Cho, Seoul (KR); Youngboo Son, Seoul (KR); Seokjong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 17/335,332

(22) Filed: Jun. 1, 2021

(65) Prior Publication Data
US 2022/0056897 A1    Feb. 24, 2022

(30) Foreign Application Priority Data
Aug. 20, 2020 (KR) .......................... 10-2020-0104854

(51) Int. Cl.
*F04B 39/00* (2006.01)
*F04B 39/12* (2006.01)
(Continued)

(52) U.S. Cl.
CPC .......... *F04B 39/0044* (2013.01); *F04B 35/04* (2013.01); *F04B 39/023* (2013.01); *F04B 39/127* (2013.01); *F16F 1/128* (2013.01)

(58) Field of Classification Search
CPC .. F04B 39/127; F04B 39/0044; F04B 39/023; F16F 1/128
See application file for complete search history.

(56) References Cited

U.S. PATENT DOCUMENTS 3,030,056 A * 4/1962 Rogers .................. F04B 39/127
                                                    267/168
3,044,688 A * 7/1962 Arne .................... F04B 39/0044
                                                    417/419
(Continued)

FOREIGN PATENT DOCUMENTS

JP     2017-048745      3/2017
KR     10-2013-0120023  11/2013
KR     10-2016-0132665  11/2016

OTHER PUBLICATIONS

Reischl R; WO-2010003896-A1; WO-2010003896-A1; WO.*
Korean Office Action issued in Application No. KR 10-2020-0104854 dated Aug. 26, 2021.

*Primary Examiner* — Christopher S Bobish
(74) *Attorney, Agent, or Firm* — Ked & Associates

(57) ABSTRACT

A hermetic compressor is provided. The hermetic compressor may include a compressor body spaced apart from an inner surface of a shell and including a motor unit and a compression unit; at least one support spring provided between the shell and the compressor body and that elastically supports the compressor body with respect to the shell; at least one stopper cap fixed to the inner surface of the shell or the compressor body facing the inner surface of the shell; and a stopper bar that extends from the compressor body or the inner surface of the shell and inserted into the at least one stopper cap with a predetermined distance therebetween. By mechanically restraining vibration of the compressor body and limiting amplitude of the compressor body, vibration noise of the compressor body may be reduced and the compressor body may be suppressed from being in contact with the shell to thereby prevent damage to the compressor body.

10 Claims, 14 Drawing Sheets

(51) Int. Cl.
  *F04B 39/02* (2006.01)
  *F16F 1/12* (2006.01)
  *F04B 35/04* (2006.01)

(56) References Cited

U.S. PATENT DOCUMENTS

| | | | | | |
|---|---|---|---|---|---|
| 3,052,435 | A | * | 9/1962 | Roller | F16F 3/10 248/569 |
| 4,108,581 | A | * | 8/1978 | Miller | F04B 39/127 417/363 |
| 4,118,153 | A | * | 10/1978 | Stannow | F04B 39/127 417/363 |
| 4,406,593 | A | * | 9/1983 | Kessler | F04B 39/14 248/618 |
| 4,431,383 | A | * | 2/1984 | Boehmler | F04B 39/127 417/415 |
| 4,559,686 | A | * | 12/1985 | Kessler | F04B 39/122 74/579 E |
| 5,772,191 | A | * | 6/1998 | Nakano | F16F 1/125 267/179 |
| 5,823,518 | A | * | 10/1998 | Nagamitsu | F16F 1/128 267/169 |
| 6,004,113 | A | * | 12/1999 | Vay | F04B 39/127 417/363 |
| 6,485,271 | B1 | * | 11/2002 | Tack | F04B 39/0044 417/363 |
| 7,357,381 | B2 | * | 4/2008 | Wakamori | B23P 19/048 267/179 |
| 9,845,798 | B2 | * | 12/2017 | Miguel | F04B 39/121 |
| 10,920,759 | B2 | * | 2/2021 | Resch | F16F 1/125 |
| 11,306,708 | B2 | * | 4/2022 | Chong | F04B 39/0055 |
| 2005/0265857 | A1 | * | 12/2005 | Lee | F04B 39/0044 417/572 |
| 2009/0110585 | A1 | * | 4/2009 | Outzen | F04B 39/127 418/179 |
| 2018/0087494 | A1 | * | 3/2018 | Brune | F04B 17/03 |
| 2021/0363982 | A1 | * | 11/2021 | Schögler | F04B 39/0284 |

* cited by examiner

HERMETIC COMPRESSOR

CROSS-REFERENCE TO RELATED APPLICATION(S)

Pursuant to 35 U.S.C. § 119(a), this application claims the benefit of the earlier filing date and the right of priority to Korean Patent Application No. 10-2020-0104854, filed in Korea on Aug. 20, 2020, the contents of which are incorporated by reference herein in their entirety.

BACKGROUND

1. Field

A hermetic compressor is disclosed herein.

2. Background

A hermetic compressor is a compressor in which both a motor unit and a compression unit that define a compressor body are installed at an inner space of a shell. Such a hermetic compressor may be classified into a fixed support method and an elastic support method according to a method of supporting a compressor body with respect to a shell.

As for the fixed support method, a compressor body is partially or entirely in close contact with an inner surface of a shell. In the elastic support method, a compressor body is elastically supported with respect to an inner circumferential surface of a shell.

A reciprocating compressor is a type of the elastic support method, which generally uses a compression coil spring to elastically support a lower end of a compressor body on a bottom surface of a shell. Such a reciprocating compressor may be classified into a connection type reciprocating compressor and a vibration type reciprocating compressor according to a method of operating a piston.

As for a connection type reciprocating compressor, such as that disclosed in Korean Laid-Open Patent Application No. 10-2013-0120023 (hereinafter "Patent Document 1"), which is hereby incorporated by reference, a piston is connected to a motor through a rotational shaft, and a connecting rod performs a reciprocating motion in a cylinder. In a vibration type reciprocating compressor, such as that disclosed in Korean Laid-Open Patent Application No. 10-2016-0132665 (hereinafter "Patent Document 2"), which is hereby incorporated by reference, a piston that is connected to a rotator of a reciprocating motor performs a reciprocating motion in a cylinder.

In both the connection type reciprocating compressor and the vibration type reciprocating compressor, transverse vibration is generated as the piston reciprocates with respect to the cylinder. Thus, conventionally, a support spring configured as a compression coil spring is used to support a compressor body on an inner surface of a shell.

However, in the conventional reciprocating compressor, as the compressor body installed in the shell is supported in a longitudinal direction by a support spring configured as a compression coil spring, the compressor body may not be securely supported in a transverse direction compared to the longitudinal direction. For example, during stop, start, inclined operation, or transport of the compressor, the compressor body inside the shell may be severely shaken in the transverse direction. This may cause increased vibration, noise, or collision between the compressor body and the shell to thereby reduce reliability of the compressor body.

In addition, as for the conventional reciprocating compressor, a support member may be separately provided in addition to the support spring to suppress collision between the compressor body and the shell. However, as a number of parts (components) and assembly man-hours are increased, manufacturing costs of the compressor may be increased. Also, a size of the compressor may be increased due to an increase in size of the compressor body including the support member.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a hermetic compressor according to embodiments will be described with reference to the accompanying drawings. As described above, in the hermetic compressor, a motor unit and a compression unit forming a compressor body may be installed in a shell. In such a hermetic compressor, a compressor body may be fixed to a shell or elastically supported on the shell by a support spring. In the embodiments disclosed herein, the latter, that is, a hermetic compressor in which a compressor body is elastically supported on a shell by a support spring will be described. Such a hermetic compressor may be classified into various types according to a compression method. In the embodiments disclosed herein, a connection type reciprocating compressor will be used as a representative example. However, embodiments are not limited to the connection type reciprocating compressor, and it may be equally applied to any hermetic compressor in which a compressor body is elastically supported on a shell.

Figure 1:
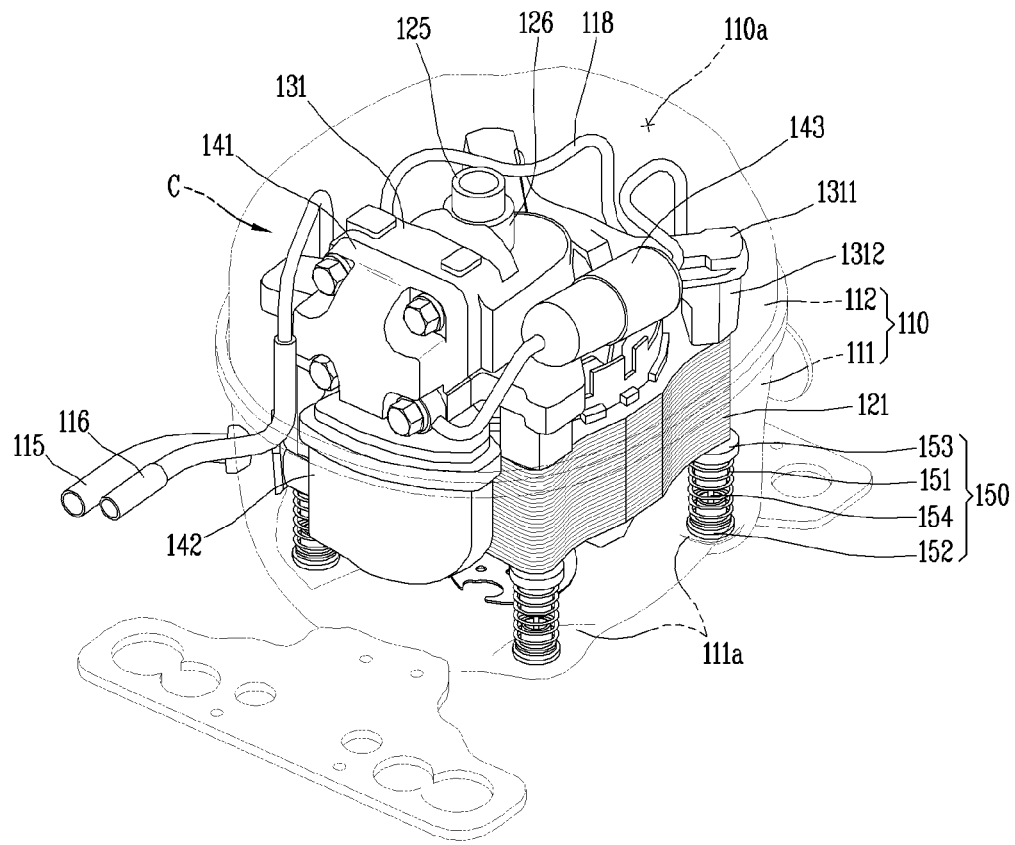
FIG. 1 is a see-through perspective view of a shell of a reciprocating compressor according to an embodiment.

FIG. 1 is a see-through perspective view of a shell of a reciprocating compressor according to an embodiment. FIG.

Figure 3:
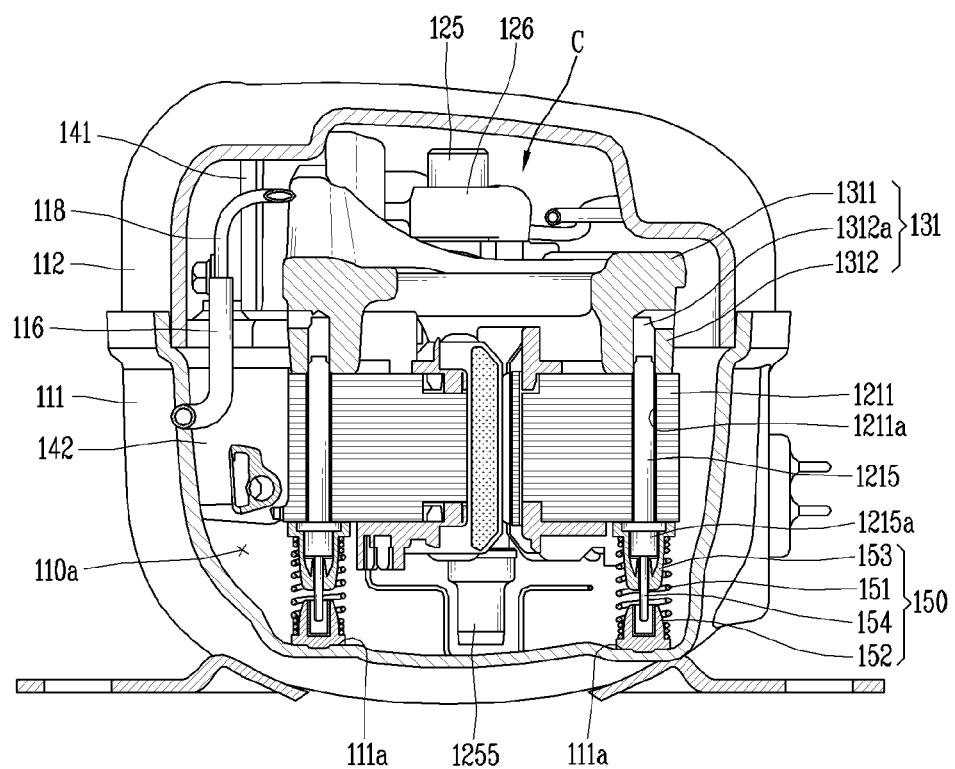
FIG. 3 is a cut cross-sectional view of a support part in FIG. 1.

2 is a cross-sectional view of an inside of the reciprocating compressor of FIG. 1. FIG. 3 is a cut cross-sectional view of a support in FIG. 1.

Figure 2:
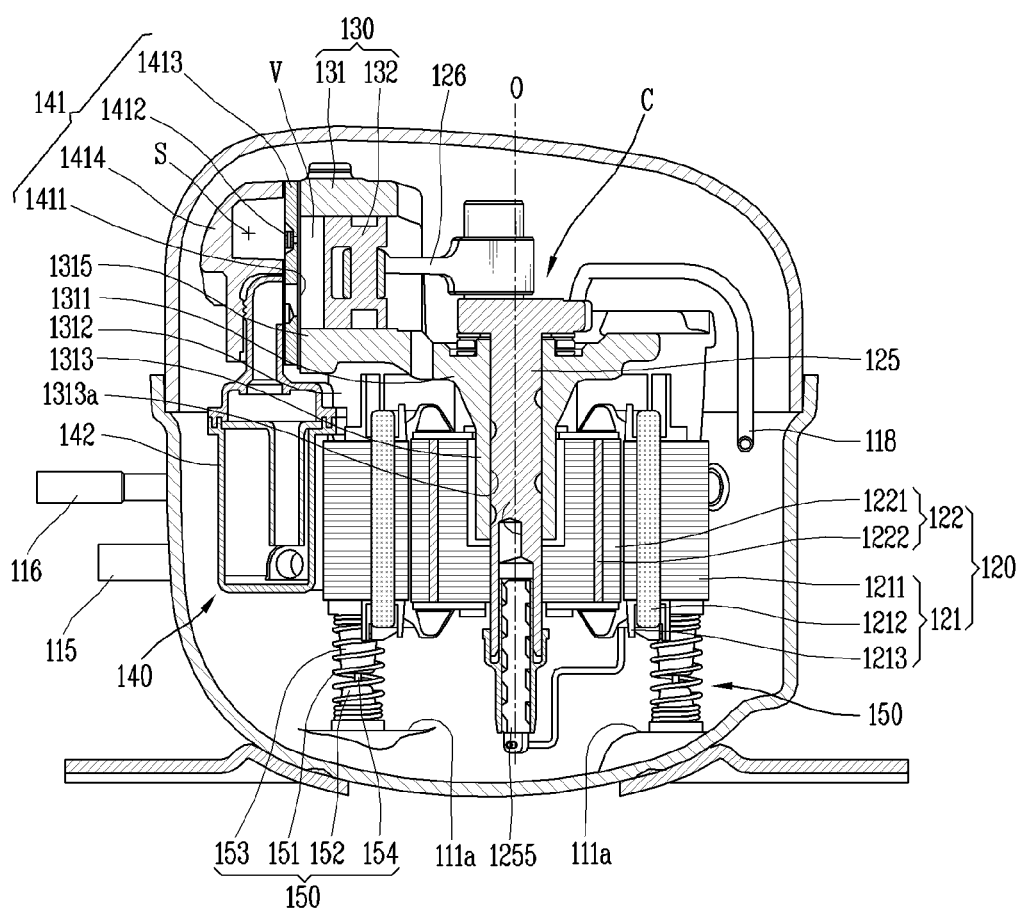
FIG. 2 is a cross-sectional view of an inside of the reciprocating compressor of FIG. 1.

Referring to FIGS. 1 and 2, a reciprocating compressor according to this embodiment may include a shell 110 that defines an outer appearance, a motor unit (motor) 120 that is disposed at an inner space 110a of the shell 110 and provides a drive force, a compression unit 130 that compresses a refrigerant by receiving the drive force from the motor unit 120, a suction and discharge part or portion 140 that guides a refrigerant to a compression chamber and discharges a compressed refrigerant, and a support part or portion (support) 150 that supports a compressor body C including the motor unit 120 and the compression unit 130 with respect to the shell 110.

The inner space 110a of the shell 110 may be sealed so as to allow the motor unit 120 and the compression unit 130 to be accommodated therein. The shell 110 may be made of an aluminum alloy (hereinafter, abbreviated as "aluminum") that is lightweight and has a high thermal conductivity, and may include a base shell 111 and a cover shell 112.

The base shell 111 may have a substantially hemisphere shape. A suction pipe 115, a discharge pipe 116, and a process pipe (not shown) may be coupled to the base shell 111 in a penetrating manner. The suction pipe 115, the discharge pipe 116, and the process pipe (not shown) may be coupled to the base shell 111 by, for example, insert die casting.

In addition, a cap mounting (or seating) surface 111a on which a first stopper cap 152 described hereinafter may be placed may be formed on a bottom surface of the base shell 111, and a cap accommodation groove 111b (see FIG. 6) that supports the first stopper cap 152 may be provided on the cap mounting surface 111a.

The cap mounting surface 111a may be formed in an annular shape throughout an entire bottom surface of the base shell 111, or be formed to correspond to a number of first stopper caps (or support springs) 152. When the first stopper cap 152 is radially disposed at four places or points, as illustrated, the cap mounting surface 111a may also be radially formed at four places or points on the bottom surface of the base shell 111, for example.

The cap accommodation groove 111b may have a shape that corresponds to a shape of a lower surface of the first stopper cap 152 described hereinafter. The lower surface of the first stopper cap 152, namely, a first cap fixing surface 1521a described hereinafter may be provided with a cap support protrusion 1521b that is convex toward a center. Accordingly, the cap accommodation groove 111b may have a shape that is concave toward the center so as to correspond to the cap support protrusion 1521b.

The cover shell 112 may have a substantially hemispherical shape like the base shell 111. The cover shell 112 may be coupled to the base shell 111 from an upper side thereof to define the inner space 110a of the shell 110.

In addition, the cover shell 112 and the base shell 111 may be coupled by, for example, welding. However, the base shell 111 and the cover shell 112 may be coupled by a bolt when they are made of an aluminum material that is not suitable for welding.

Hereinafter, the motor unit will be described.

In some embodiments, the motor unit 120 may include a stator 121 and a rotor 122. The stator 121 may be elastically supported with respect to the inner space 110a of the shell 110, namely, the bottom surface of the base shell 111, and the rotor 122 may be rotatably installed inside the stator 121.

In some embodiments, the stator 121 may include a stator core 1211 and a stator coil 1212. The stator core 1211 may be made of a metal material, such as an electrical steel sheet, and perform electromagnetic interaction with the stator coil 1212 and the rotor 122 described hereinafter through an electromagnetic force when a voltage is applied to the motor unit 120 from the outside.

In addition, the stator core 1211 may have a substantially rectangular cylinder shape. For example, an inner circumferential surface of the stator core 1211 may have a circular shape, and an outer circumferential surface thereof may be formed in a rectangular shape. Bolt holes 1211a may be formed through four corners of the stator core 1211, respectively, and stator fastening bolts 1215 may penetrate through the bolt holes 1211a, respectively, so as to be fastened to a cylinder block 131 described hereinafter. Accordingly, the stator core 1211 may be fixed to a lower surface of the cylinder block 131 by the stator fastening bolts 1215.

Further, a lower end of the stator core 1211 may be supported by a support spring 151 described hereinafter with respect to the bottom surface of the shell 110 in a state in which the stator core 1211 is axially and radially spaced apart from an inner surface of the shell 110. This may prevent vibration generated during operation from being directly transferred to the shell 110.

The stator coil 1212 may be wound inside the stator core 1211. As described above, when a voltage is applied from the outside, the stator coil 1212 may generate an electromagnetic force to perform electromagnetic interaction with the stator core 1211 and the rotor 122. This may allow the motor unit 120 to generate a drive force for the compression unit 130 to perform a reciprocating motion.

An insulator 1213 may be disposed between the stator core 1211 and the stator coil 1212. This may prevent direct contact between the stator core 1211 and the stator coil 1212 to thereby facilitate the electromagnetic interaction.

In some embodiments, the rotor 122 may include a rotor core 1221 and magnets 1222. The rotor core 1221 may be made of a metal material, such as an electrical steel plate, like the stator core 1211, and may have a substantially cylindrical shape. A crankshaft 125 described hereinafter may be, for example, press-fitted and coupled to a central portion or part of the rotor core 1221.

The magnets 1222 may be configured as permanent magnets and be inserted into the rotor core 1221 at equal intervals along a circumferential direction of the rotor core 1221. When a voltage is applied, the rotor 122 may be rotated by electromagnetic interaction with the stator core 1211 and the stator coil 1212. Then, the crankshaft 125 may rotate together with the rotor 122, allowing a rotational force of the motor unit 120 to be transferred to the compression unit 130 through a connecting rod 126.

Hereinafter, the compression unit will be described.

In some embodiments, the compression unit 130 may include a cylinder block 131 and a piston 132. The cylinder block 131 may be elastically supported on the shell 110, and the piston 132 may be coupled to the crankshaft 125 by the connecting rod 126 so as to perform a relative motion with respect to the cylinder block 131.

In some embodiments, the cylinder block 131 may be provided at an upper part or portion of the motor unit 120. The cylinder block 131 may include a frame 1311, a fixing protrusion 1312 that is coupled to the stator 121 of the motor unit 120, a shaft receiving (or accommodating) portion 1313 that supports the crankshaft 125, and a cylinder unit 1315 that defines a compression chamber V. The frame 1311 may have a flat plate shape extending in a transverse direction, or a radial plate shape by processing a portion of an edge excluding corners to reduce weight or thickness.

The fixing protrusion 1312 may be provided at an edge of the frame 1311. For example, the fixing protrusion 1312 may protrude downward, from the edge of the frame 1311 to the motor unit 120.

A fastening hole 1312a may be formed in the fixing protrusion 1312 to communicate with the bolt hole 1211a provided in the stator 121. Accordingly, the cylinder block 131 and the stator 121 may be coupled by the stator fastening bolt 1215 described hereinafter, so as to be elastically supported on the base shell 111 together with the stator 121 of the motor unit 120.

The shaft receiving portion 1313 may extend from a central portion of the frame 1311 in both axial directions. A shaft receiving hole 1313a may be axially formed through the shaft receiving portion 1313 so as to allow the crankshaft 125 to penetrate therethrough, and a bush bearing may be insertedly coupled to an inner circumferential surface of the shaft receiving hole 1313a.

The cylinder unit (hereinafter, abbreviated as "cylinder") 1315 may be radially eccentric from one edge of the frame 1311. The cylinder 1315 may radially penetrate through the cylinder block 131 so that the piston 132 connected to the connecting rod 126 may be inserted into an inner open end thereof, and a valve assembly 141 forming the suction and discharge part 140 described hereinafter may be inserted into an outer open end thereof.

In some embodiments, the piston 132 may be formed such that a side that faces the connecting rod 126 (a rear side) is open and an opposite side thereof, namely, a front side is closed. Accordingly, the connecting rod 126 may be inserted into the rear side of the piston 132 to be rotatably coupled, and the front side of the piston 132 may be closed to form the compression chamber V inside the cylinder 1315 together with the valve assembly 141 described hereinafter.

In addition, the piston 132 may be made of the same material as the cylinder block 131, for example, an aluminum alloy. This may prevent a magnetic flux from being transferred to the piston 132 from the rotor 122.

Further, as the piston 132 is made of the same material as the cylinder block 131, the piston 132 and the cylinder block (more precisely, the cylinder) 131 may have a same coefficient of thermal expansion. Accordingly, even when the inner space 110a of the shell 110 is in a high temperature condition (approximately 100° C.) during operation of the compressor, interference between the cylinder block 131 and the piston 132, caused by thermal expansion, may be suppressed or reduced.

Hereinafter, the suction and discharge part will be described.

In some embodiments, the suction and discharge part 140 may include the valve assembly 141, a suction muffler 142, and a discharge muffler 143. The valve assembly 141 and the suction muffler 142 may be sequentially coupled from an outer open end of the cylinder 1315.

In some embodiments, the valve assembly 141 may include a suction valve 1411 and a discharge valve 1412 so as to be coupled to an end of the cylinder block 131. The suction valve 1411 and the discharge valve 1412 may be provided in a separate manner, however, in general, they may be provided together on a same valve plate.

The suction valve 1411 may be opened and closed in a direction toward the piston 132, whereas the discharge valve 1412 may be opened and closed in a direction opposed to the suction valve 1411. Accordingly, unlike the suction valve 1411, the discharge valve 1412 may be provided with a retainer (no reference numeral) that limits a degree of opening of the discharge valve 1412.

In addition, the valve assembly 141 may further include a valve plate 1413 that supports the suction valve 1411 and a cylinder cover 1414 that is coupled to the valve plate 1413 and supports the suction muffler 142. The valve plate 1413 and the cylinder cover 1414 may be coupled to the cylinder block 131 by, for example, a bolt, and a discharge space S may be formed in the cylinder cover 1414 so as to be connected to the discharge muffler 143 described hereinafter through a loop pipe 118.

In some embodiments, the suction muffler 142 may transfer a refrigerant suctioned through the suction pipe 115 to the compression chamber V of the cylinder 1315. The suction muffler 142 may be fixedly coupled to an end surface of the cylinder block 131 by the valve assembly 141, or a clamp (not shown).

The suction muffler 142 may be provided therein with a suction space portion (suction space) (no reference numeral). An inlet (or entrance) of the suction space portion may communicate with the suction pipe 115 in a direct or indirect manner, and an outlet (or exit) of the suction space portion may directly communicate with a suction side of the valve assembly 141.

In some embodiments, the discharge muffler 143 may be installed separately from the cylinder block 131. The discharge muffler 143 may be provided therein with a discharge space portion (discharge space) (no reference numeral). An inlet of the discharge space portion may be connected to a discharge side of the valve assembly 141 by the loop pipe 118, and an outlet of the discharge space portion may be directly connected to the discharge pipe 116 by the loop pipe 118.

Hereinafter, the support part will be described.

In some embodiments, each of the support parts 150 may include the support spring 151, the first stopper cap 152, a second stopper cap 153, and a stopper bar 154. The support parts 150 provide support between a lower surface of the motor unit 120 and the bottom surface of the base shell 111 that faces the lower surface of the motor unit 120, which, in general, support four corners of the motor unit 120 that defines the compressor body C with respect to the shell 110.

Each support part 150 defines a unitary support assembly made up of the support spring 151, the first stopper cap 152, the second stopper cap 153, and the stopper bar 154 so that the support parts 150 respectively support four corners of the compressor body C with respect to the shell 110. However, the stopper bar 154 may be provided in one or some of the four unitary support assemblies. Hereinafter, one unitary support assembly will be used as a representative example.

In some embodiments, the support spring 151 may be configured as a compression coil spring. A lower end of the support spring 151 may be insertedly fixed to the first stopper cap 152, and an upper end of the support spring 151 may be insertedly fixed to the second stopper cap 153. Accordingly, the stator core 1211 that defines a portion of the compressor body C may be elastically supported on the shell 110 by the support spring 151.

In some embodiments, the first stopper cap 152 may be fixed to the bottom surface of the base shell 111 by, for example, press-fitting or welding, and the second stopper cap 153 may be fixed to the lower surface of the motor unit 120 (more precisely, a lower end of the stator fastening bolt that penetrates through the stator core).

The first stopper cap 152 and the second stopper cap 153 may be located on a same axial line or different axial lines. When the first stopper cap 152 and the second stopper cap 153 are located on different axial lines, the second stopper cap 153 may be located at an outer side than the first stopper cap 152 to more securely support the compressor body C.

In addition, the first stopper cap 152 and the second stopper cap 153 may be made of a rubber material, for example, or may be formed by wrapping an outer circumferential surface of a metal material with a rubber or plastic material in consideration of installation rigidity and buffering (protection). For example, the first stopper cap 152 may be made of a metal material as it should be inserted into the cap accommodation groove 111b of the base shell 111 which may be made of a metal to be firmly fixed by, for example, welding. However, the second stopper cap 153 may be made of a rubber or plastic material as the second stopper cap 153 may be inserted into and fixed to a bolt head portion (bolt head) 1215a of the stator fastening bolt 1215 that axially protrudes from a lower surface of the stator core 1211.

The stopper bar 154 may be inserted into the first stopper cap 152 or the second stopper cap 153 in a manner of being radially and axially spaced apart by a predetermined distance or interval, and the second stopper cap 153 or the first stopper cap 152 may be coupled to each other or integrally formed so as to allow the stopper bar 154 to penetrate therethrough. The first stopper cap 152 and the second stopper cap 153 will be described hereinafter.

In some embodiments, the stopper bar 154 may extend from the bolt head portion 1215a of the stator fastening bolt 1215, or from the first stopper cap 152. The stopper bar 154 will be also discussed hereinafter.

In the drawings, unexplained reference numeral 1255 denotes an oil feeder.

The reciprocating compressor according to this embodiment may operate as follows.

That is, when power is applied to the motor unit 120, the rotor 122 may rotate. When the rotor 122 rotates, the crankshaft 125 which is coupled to the rotor 122 may rotate together to thereby transfer a rotational force to the piston 132 through the connecting rod 126. The connecting rod 126 allows the piston 132 to perform a reciprocating motion in a frontward-and-rearward (or back-and-forth) direction with respect to the cylinder 1315.

For example, when the piston 132 moves backward from the cylinder 1315, a volume of the compression chamber V increases. When the volume of the compression chamber V is increased, a refrigerant filled in the suction space portion of the suction muffler 142 passes through the suction valve 1411 of the valve assembly 141, and is then suctioned into the compression chamber V of the cylinder 1315.

In contrast, when the piston 132 moves forward from the cylinder 1315, the volume of the compression chamber V decreases. When the volume of the compression chamber V is decreased, a refrigerant filled in the compression chamber V is compressed, passes through the discharge valve 1412 of the valve assembly 141, and is then discharged to the discharge space portion of the discharge muffler 143. This refrigerant is discharged to a refrigeration cycle through the discharge pipe 116. Such series of processes are repeated.

Due to characteristics of the reciprocating compressor, the crankshaft 125, the connecting rod 126, and the piston 132 are disposed to be eccentric in a compression direction (transverse or radial direction), and thus, the reciprocating compressor has an eccentric mass in the compression direction of the piston 132. Accordingly, the compressor body C vibrates when the crankshaft 125 rotates, due to the eccentric mass of these members.

This vibration is transmitted to the shell 110 through the support part 150 to thereby cause vibration of the compressor. However, the vibration transferred from the compressor body C to the shell 110 is attenuated by the support spring 151 of the support part 150.

Performance of the support part 150 is related to spring stiffness (or rigidity) of the support spring. For example, if stiffness in a longitudinal direction of the support spring is high, the support spring may not effectively absorb vibration transmitted to the shell from the compressor body. If the stiffness of the support spring is lower, the vibration transferred from the compressor body to the shell may be effectively absorbed by the support spring. Hereinafter, the terms "longitudinal direction" and "transverse direction" will be interchangeably used with the terms "axial direction" and "radial direction", respectively.

However, if the stiffness of the support spring is too low, an amount of transverse displacement of the compressor body (hereinafter, "transverse amplitude") increases. This may result in increasing vibration noise of the compressor body or the possibility of collision between the compressor body and the shell. Vibration noise of the compressor body, or a collision between the compressor body and the shell may occur more significantly during stop/restart, inclined operation, or transport of the compressor. Therefore, in this embodiment, the stopper cap and the stopper bar are used to mechanically constrain the compressor body, allowing an excessive increase in the transverse amplitude of the compressor body to be suppressed.

Figure 4:
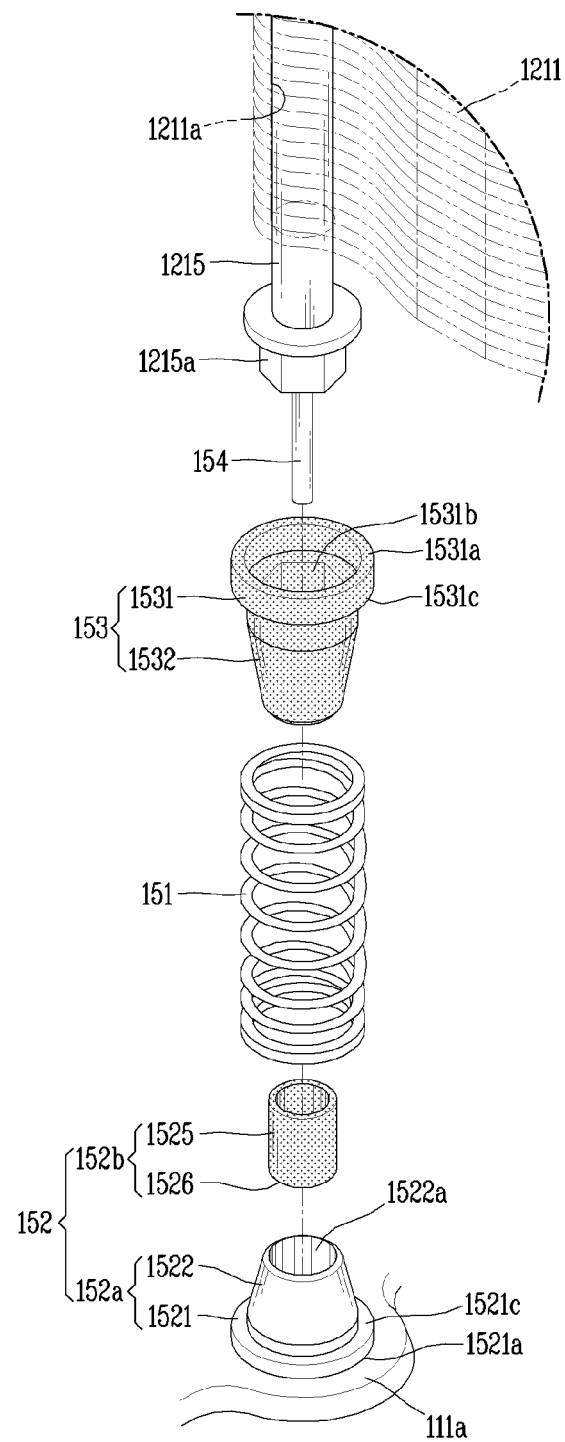
FIG. 4 is a disassembled perspective view of the support part in FIG. 3 viewed from above.
Figure 5:
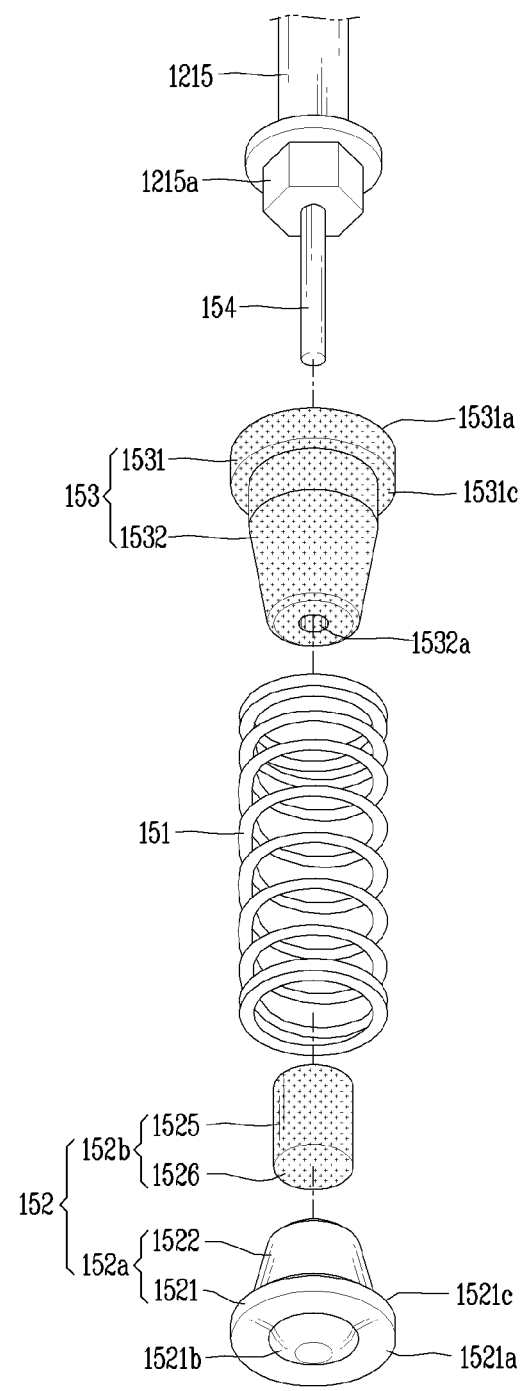
FIG. 5 is a disassembled perspective view of the support part in FIG. 3 viewed from below.
Figure 6:
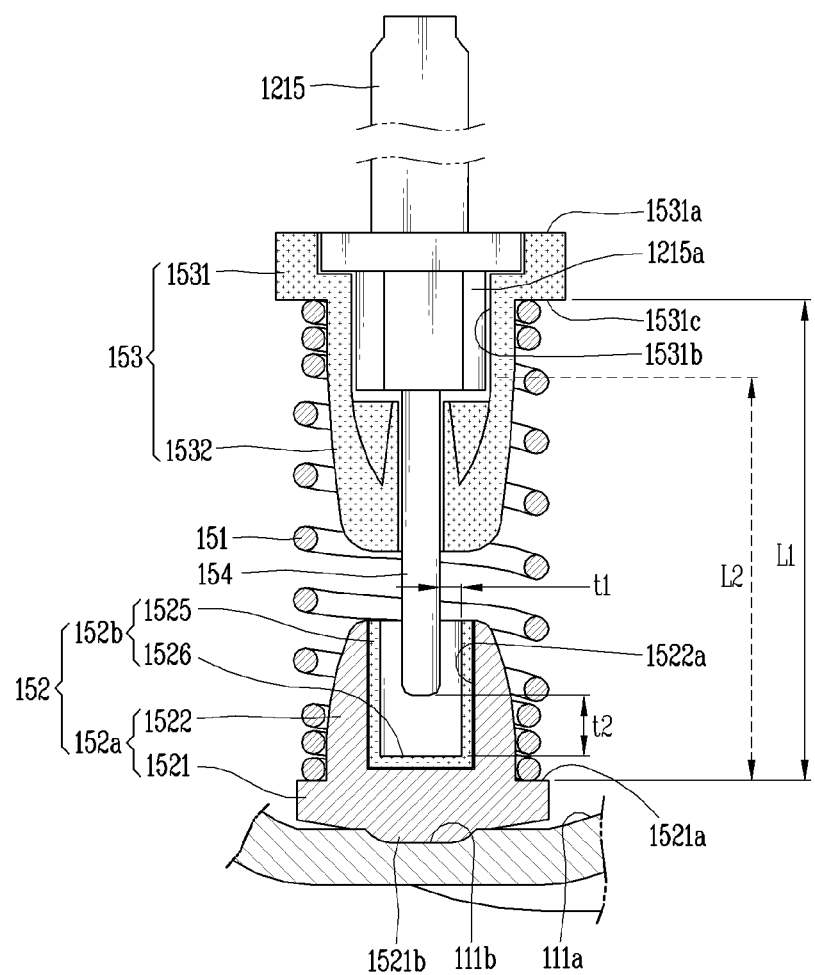
FIG. 6 is a cross-sectional view of an assembled state of the support part in FIGS. 4 and 5.

FIG. 4 is a disassembled perspective view of the support part in FIG. 3 viewed from above. FIG. 5 is a disassembled perspective view of the support part in FIG. 3 viewed from below. FIG. 6 is a cross-sectional view of an assembled state of the support part in FIGS. 4 and 5.

Referring to FIGS. 4 to 6, the first stopper cap 152 in some embodiments may include an outer cap 152a and an inner cap 152b. The outer cap 152a may be fixed to the cap mounting surface 111a, which is the bottom surface of the base shell 111, and the inner cap 152b may be fixedly inserted into the outer cap 152a.

In addition, the outer cap 152a may be made of a metal material so as to be fixed to the base shell 111 by, for example, welding, and the inner cap 152b may be made of a material having a lower rigidity than the outer cap 152a, for example, a rubber or plastic material.

In some embodiments, the outer cap 152a may include a first spring support portion 1521 and a stopper support portion 1522. The first spring support portion 1521 may have a disk (or disc) shape. A lower surface of the first spring support portion 1521 defining a lower surface of the outer cap 152a may be placed or mounted on the bottom surface of the base shell 111, namely, on the cap mounting surface 111a of the base shell 11 in a close contact manner in the axial direction.

The cap support protrusion 1521b may be formed at a central portion of the first cap fixing surface 1521a defined by the lower surface of the first spring support portion 1521. For example, the cap accommodation groove 111b may be formed on the cap mounting surface 111a of the base shell 111, and the cap support protrusion 1521b may be formed on the first cap fixing surface 1521a of the first spring support portion 1521 in a manner of protruding toward the cap accommodation groove 111b. The cap support protrusion 1521b may have a hemispherical shape, an angular (or angled) shape, and other various shapes.

As the cap support protrusion 1521b is inserted into the cap accommodation groove 111b, an assembly position of the first stopper cap 152 may be quickly aligned when assembled. In addition, as the cap support protrusion 1521b is fixed to the base shell 111 in the cap accommodation groove 111b by, for example, spot welding, the first stopper cap 152 may be securely maintained in the assembled state.

A first spring support surface 1521c with which the lower end of the support spring 151 is in close contact may be formed on an upper surface of the first spring support portion 1521. The first spring support surface 1521c may be formed in an annular shape along a circumference of the stopper support portion 1522 described hereinafter. The first spring support surface 1521c may be parallel to the cap mounting surface 111a of the base shell 111.

An outer diameter of the first spring support portion 1521, namely, an outer diameter of the first spring support surface 1521c may be greater than or equal to an outer diameter of the support spring 151. Accordingly, a lower end of the support spring 151 may be axially supported by being in close contact with the upper surface of the first spring support portion 1521, namely, the first spring support surface 1521c.

The stopper support portion 1522 may extend in the axial direction to have a hollow cylindrical shape so that the inner cap 152b described hereinafter may be inserted therein and an inside thereof defines a stopper accommodation groove 1522a. However, the stopper support portion 1522 may not necessarily be formed in a cylindrical shape. For example, the stopper support portion 1522 may have an angular shape, such as a square cylinder.

An upper surface of the stopper support portion 1522 may be open so as to allow the inner cap 152b and the stopper bar 154 to be inserted therein, whereas a lower surface of the stopper support portion 1522 may be closed so as to be fixed to the cap mounting surface 111a which is the bottom surface of the base shell 111. However, the lower surface of the stopper support portion 1522 may be open. That is, as a lower surface of the inner cap 152b which is inserted into the stopper support portion 1522 is closed, the lower surface of the inner cap 152b may be supported on the cap mounting surface 111a, which is the bottom surface of the base shell 111, even when the lower surface of the outer cap 152a is open.

An outer circumferential surface of the stopper support portion 1522 may be formed such that a lower half of the outer circumferential surface has a constant (same) outer diameter and an upper half of the outer circumferential surface has a truncated cone shape which becomes narrower toward the top. For example, an outer diameter of the stopper support portion 1522 may be less (or smaller) than an inner diameter of the support spring 151. Accordingly, the lower end of the support spring 151 may be fitted to the outer circumferential surface of the stopper support portion 1522 so as to be supported in the radial direction.

The inner cap 152b according to this embodiment may be inserted into the stopper support portion 1522 of the outer cap 152a so that the inner cap 152b defines an actual inner surface of the stopper accommodation groove 1522a. The inner cap 152b may be manufactured separately from the outer cap 152a to be assembled together, or may be coated on an inner surface of the outer cap 152a.

The inner cap 152b may include a radial support portion 1525 and an axial support portion 1526. The radial support portion 1525 may correspond to an inner surface of the stopper support portion 1522 that defines a portion of the outer cap 152a. For example, the radial support portion 1525 may have a cylindrical shape with an open upper end, and have a constant inner diameter in the axial direction. Accordingly, the stopper bar 154 which is inserted into the stopper accommodation groove 1522a may be brought into contact with the inner surface of the stopper accommodation groove 1522a as the compressor body C vibrates, allowing the transverse amplitude of the compressor body C to be limited or restricted.

The axial support portion 1526 may correspond to the lower surface of the stopper support portion 1522 that defines a portion of the outer cap 152a. For example, the axial support portion 1526 may have a disk shape.

The radial support portion 1525 and the axial support portion 1526 may be integrally formed. For example, the radial support portion 1525 and the axial support portion 1526 may be made of a material capable of absorbing a collision force generated when colliding with the stopper bar 154, namely, a rubber or plastic material as described above.

However, the radial support portion 1525 and the axial support portion 1526 may be formed independently. In this case, the radial support portion 1525 and the axial support portion 1526 may be made of the same material or different materials.

Hereinafter, the second stopper cap will be described.

The second stopper cap 153 according to this embodiment may have a shape substantially similar to the shape of the first stopper cap 152. The second stopper cap 153 may be made of an elastic material, for example, a rubber or plastic material. Accordingly, impact generated when the stopper bar 154 collides with the second stopper cap 153 may be reduced.

In some embodiments, the second stopper cap 153 may include a second spring support portion (second spring support) 1531 and a spring insertion portion 1532. The second spring support portion 1531 may have a disk shape. An upper surface of the second spring support portion 1531, namely, a second cap fixing surface 1531a may be fixed to the compressor body C by being in close contact with a lower surface of the stator core 1211 that defines a lower surface of the compressor body C.

In the second spring support portion 1531, a bolt insertion groove 1531b may be formed at a central portion of the second cap fixing surface 1531a. An inner circumferential surface of the bolt insertion groove 1531b may have an angular shape so as to correspond to an outer circumferential surface of the bolt head portion 1215a. Accordingly, the second stopper cap 153 may be insertedly coupled to the bolt head portion 1215a of the stator fastening bolt 1215 that penetrates through the stator core 1211.

A second spring support surface 1531c may be formed on a lower surface of the second spring support portion 1531. Like the first spring support surface 1521c, the second spring support surface 1531c may be formed in an annular shape along a circumference of the spring insertion portion 1532 described hereinafter.

An outer diameter of the second spring support portion 1531 may be greater than or equal to the support spring 151. Accordingly, an upper end of the support spring 151 which is externally fitted to the spring insertion portion 1531 described hereinafter in an inserted manner may be supported by being in close contact with the second spring support surface 1531c formed on the lower surface of the second spring support portion 1531.

The second spring support surface 1531c may be symmetrical with the first spring support surface 1521c. For example, the second spring support surface 1531c may be parallel to the lower surface of the stator core 1211.

The spring insertion portion 1532 may be symmetrical with the stopper support portion 1522 of the first stopper cap 152. For example, the spring insertion portion 1532 may extend from the lower surface of the second spring support portion 1531, namely, from a central portion of the second spring support surface 1531c. The spring insertion portion 1532 may have a cylindrical shape, more specifically, a truncated cone shape that becomes narrower toward the bottom.

A stopper through-hole (or stopper penetration hole) 1532a may be formed in a lower end of the spring insertion portion 1532 so as to allow the stopper bar 154 to penetrate therethrough. An inner diameter of the stopper through-hole 1532a may be substantially the same as an outer diameter of the stopper bar 154.

The stopper bar 154 according to this embodiment may axially extend from the bolt head portion 1215a of the stator fastening bolt 1215. Accordingly, the stopper bar 154 may be easily fixed to the compressor body C without any separate fixing member. Further, as the stopper bar 154 extends from the bolt head portion 1215a, a required thickness of the stopper bar 154 may be easily achieved, thereby preventing the stopper bar 154 from being buckled or bent.

The stopper bar 154 may extend toward the first stopper cap 152 so as to be inserted therein, and an outer diameter extending from one (first) end to another (opposite) (second) end of the stopper bar 154 may be constant. The outer diameter of the stopper bar 154 may be less than an outer diameter of the bolt head portion 1215a. However, the outer diameter of the stopper bar 154 may vary along a lengthwise direction (axial direction).

Referring to FIG. 6, the stopper bar 154 may be spaced apart from an inner circumferential surface (radial support portion) and bottom surface (axial support portion) of the inner cap 152b of the first stopper cap 152 in a state in which the compressor is stopped. For example, the outer diameter of the stopper bar 154 may be less than an inner diameter of the inner cap 152b, and with respect to the bolt head portion 1215a of the stator fastening bolt 1215, a length to a lower end of the stopper bar 154 may be less than a length to the axial support portion 1526 of the inner cap 152b.

More specifically, a radial distance (hereinafter, "first distance") t1 from an outer circumferential surface of the stopper bar 154 to an inner circumferential surface of the inner cap 152b may be defined as a value which is less than or equal to a half (½) of the value obtained by subtracting the outer diameter of the stopper bar 154 from the inner diameter of the inner cap 152b. Alternatively, when an upper stopper (not shown) is separately provided on an upper surface of the compressor body C, the first distance t1 may be less than or equal to an approximately half (½) of the allowable value of the upper stopper. Accordingly, a collision between the compressor body C and the shell 110 occurring when the transverse amplitude of the compressor body C is excessively allowed may be suppressed, and damage to the stopper bar (or stopper cap) 154 caused when the transverse amplitude of the compressor body C is excessively limited may be suppressed.

In addition, an axial distance (hereinafter, "second distance") t2 between the lower end of the stopper bar 154 and the inner cap 152b may be defined as a value which is less than or equal to a value obtained by subtracting a length (a compressed length of the spring) L2 of the fully compressed support spring 151 from a length (a normal length of the spring) L1 of the support spring 151 measured when the compressor is stationary. Accordingly, reliability of the compressor body C may be improved by suppressing shaking of the compressor body C caused when the longitudinal amplitude is excessively allowed, which is due to the inclined compressor body C.

Figure 7:
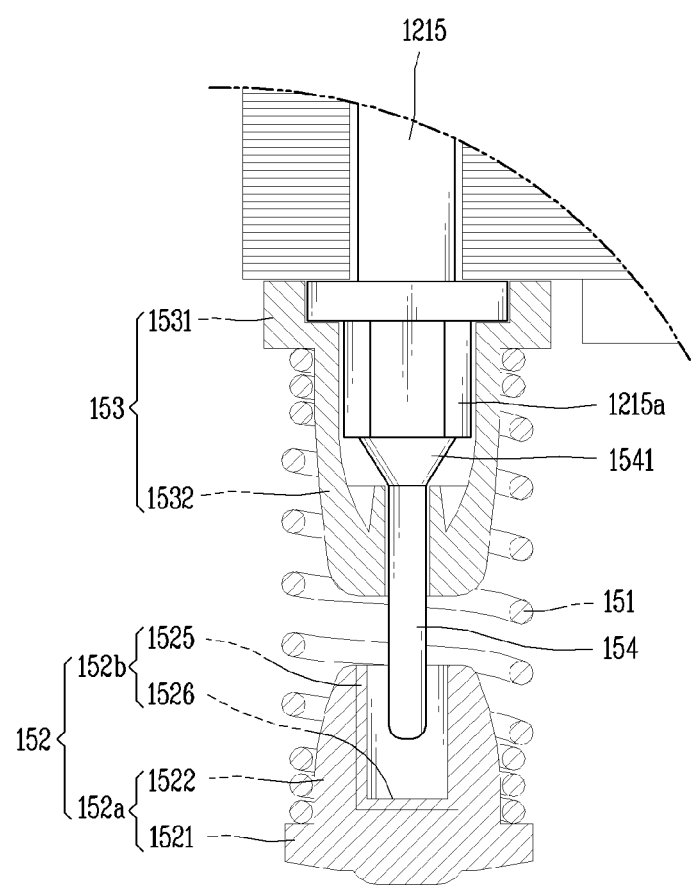
FIG. 7 is a cross-sectional view of a stopper bar according to another embodiment.

However, a portion or point at which the stopper bar 154 starts may be susceptible to stress. Accordingly, a stopper reinforcing portion may be provided at the portion where the stopper bar starts. FIG. 7 is a cross-sectional view of a stopper bar according to another embodiment.

A stopper reinforcing portion 1541 according to this embodiment may be formed on an upper end of the stopper bar 154. For example, the stopper reinforcing portion 1541 may be formed at a portion at which the stopper bar 154 extends from the bolt head portion 1215a in order to reinforce a strength of the stopper bar 154. This may prevent breakage of a portion at which the stopper bar 154 starts.

An outer diameter of the stopper reinforcing portion 1541 may be less than an outer diameter of an upper end of the stopper support portion 1522 but greater than an outer diameter of the stopper bar 154. The stopper reinforcing portion 1541 may have a constant outer diameter. However, in some embodiments, the stopper reinforcing portion 1541 may be formed in a truncated cone shape.

Although not illustrated in the drawings, the stopper bar 154 may have a tapered shape that becomes thicker toward the bolt head portion 1215a.

As the stopper bar extends from the bolt head portion of the stator fastening bolt, and the stopper accommodation groove is formed on the first stopper cap which is fixed to the shell so that the stopper bar is inserted into the stopper accommodation groove to be radially and axially supported, vibration of the compressor body may be mechanically constrained to thereby reduce the transverse amplitude of the compressor body.

Figure 8:
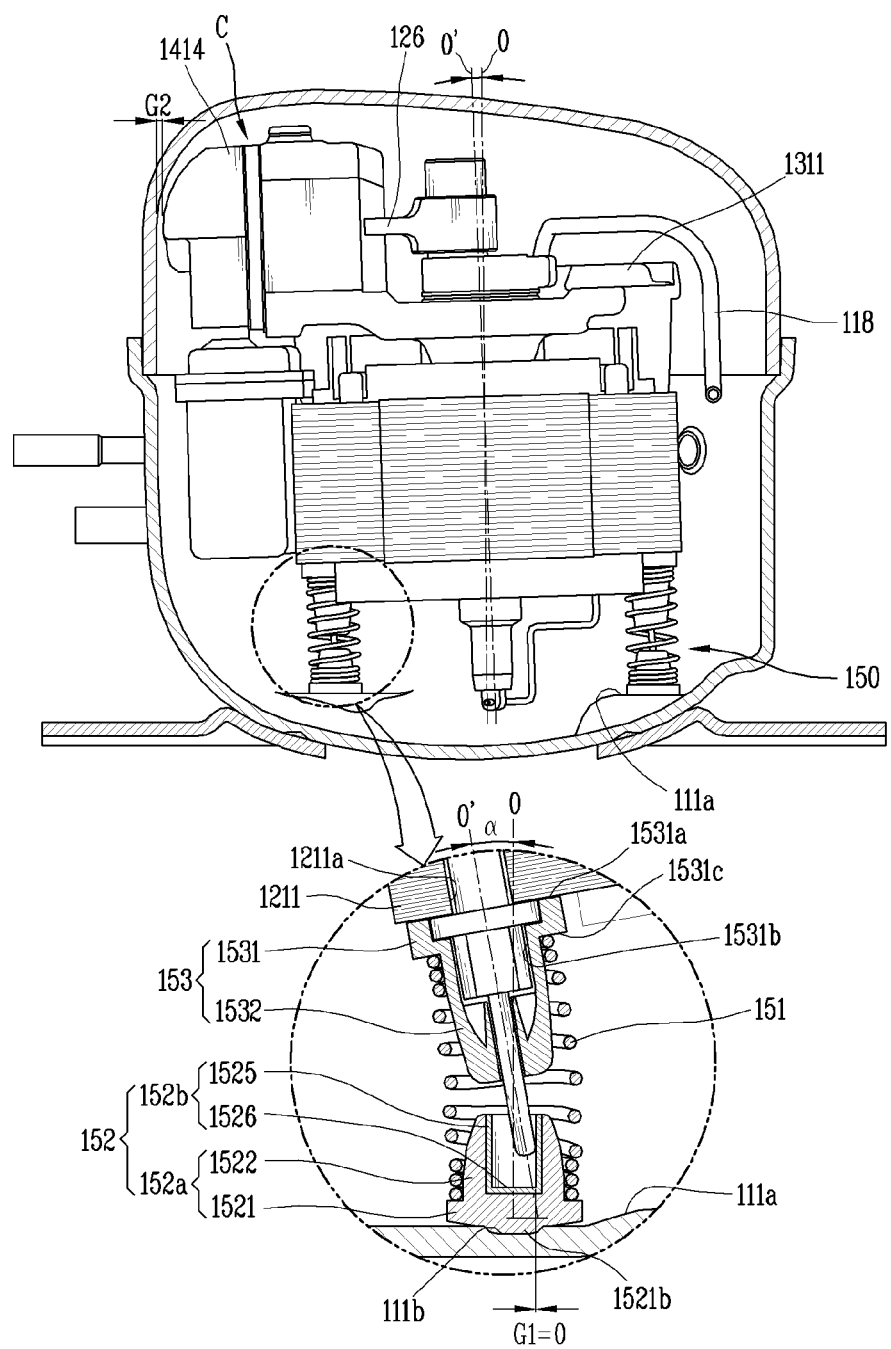
FIG. 8 is a cross-sectional view illustrating a vibrating state of a reciprocating compressor according to an embodiment.

FIG. 8 is a cross-sectional view illustrating a vibrating state of a reciprocating compressor according to an embodiment. As for the reciprocating compressor, in general, the compressor body C vibrates in the longitudinal and transverse directions with respect to the shell 110 when the compressor is operated. In particular, as the support part 150 configured as a compression coil spring axially supports the compressor body C with respect to the shell 110, vibration of the compressor body C is generated more significantly in the transverse direction than in the longitudinal direction.

However, as shown in FIG. 8, the stopper bar 154 that extends from the compressor body C is brought into contact with the inner cap 152b of the first stopper cap 152 which is fixed to the base shell 111 before an upper edge of the compressor body C, namely, the cylinder cover 1414 of the valve assembly 141 or the frame 1311 of the cylinder block 131 collides with an inner circumferential surface of the cover shell 112. Then, the compressor body C is stopped in a state of being inclined by an angle at which a center O' of the stopper bar 154 intersects with an axial center O of the crank shaft 125, that is, a constraint angle α at which the stopper bar 154 is in contact with the first stopper cap 152.

Accordingly, the stopper bar 154 and the first stopper cap 152 are in contact (G1=0) with each other, whereas an edge of the compressor body C and an inner circumferential surface of the shell 110 are spaced apart by a predetermined distance (or gap) G2. As a result, the amplitude of the compressor body C may be reduced, and at the same time, the compressor body C may be suppressed from colliding with the inner circumferential surface of the shell 110.

This may allow vibration noise of the compressor body to be reduced and suppress the compressor body from being in contact with the shell, thereby preventing damage to the compressor body. Further, as the stopper bar extends from the stator fastening member by which the motor unit is fixed to the compression unit, the stopper bar may be formed without adding a separate component. This may result in reducing manufacturing costs of the compressor.

Hereinafter, description will be given of a support part according to another embodiment. That is, in the example described above, the stopper bar is provided at the compressor body. However, in some cases, the stopper bar may be provided at the shell.

Figure 9:
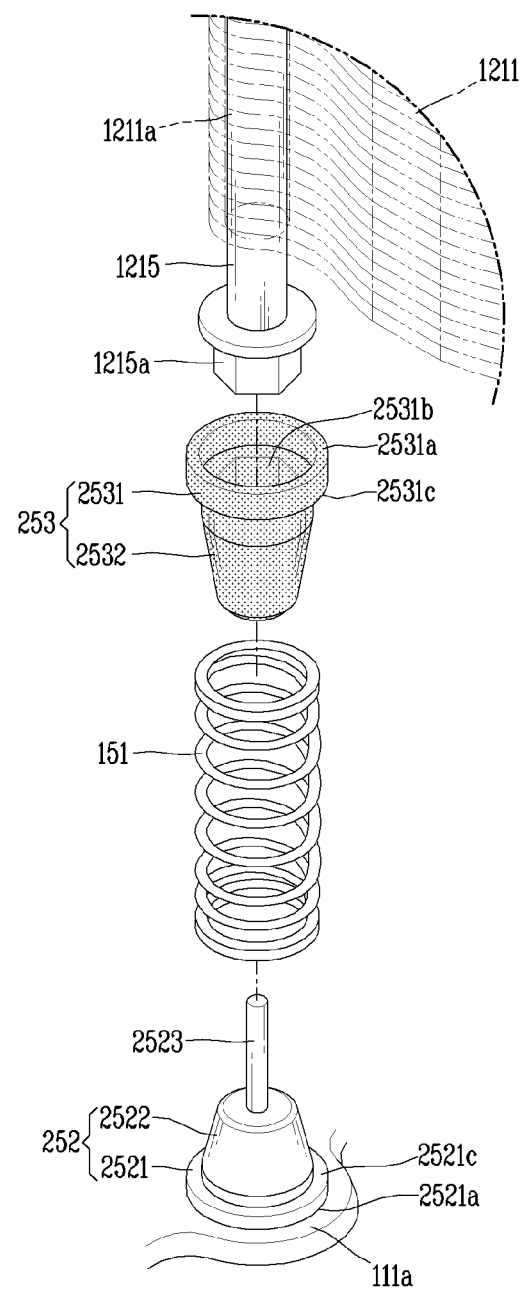
FIGS. 9 and 10 are dissembled perspective views illustrating another embodiment of a support part viewed from above and below, respectively.
Figure 10:
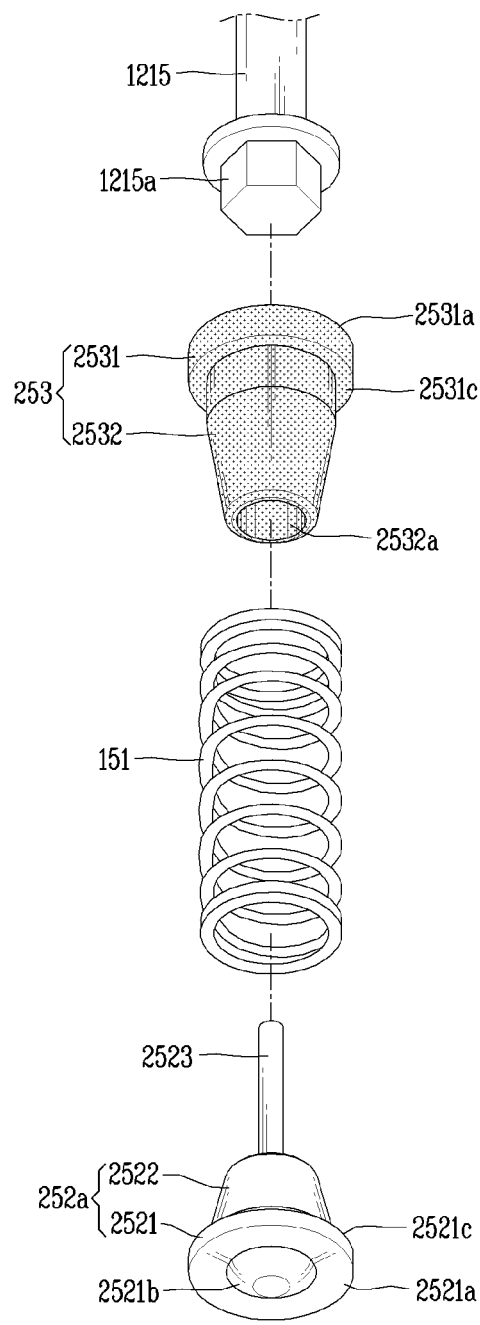
Figure 11:
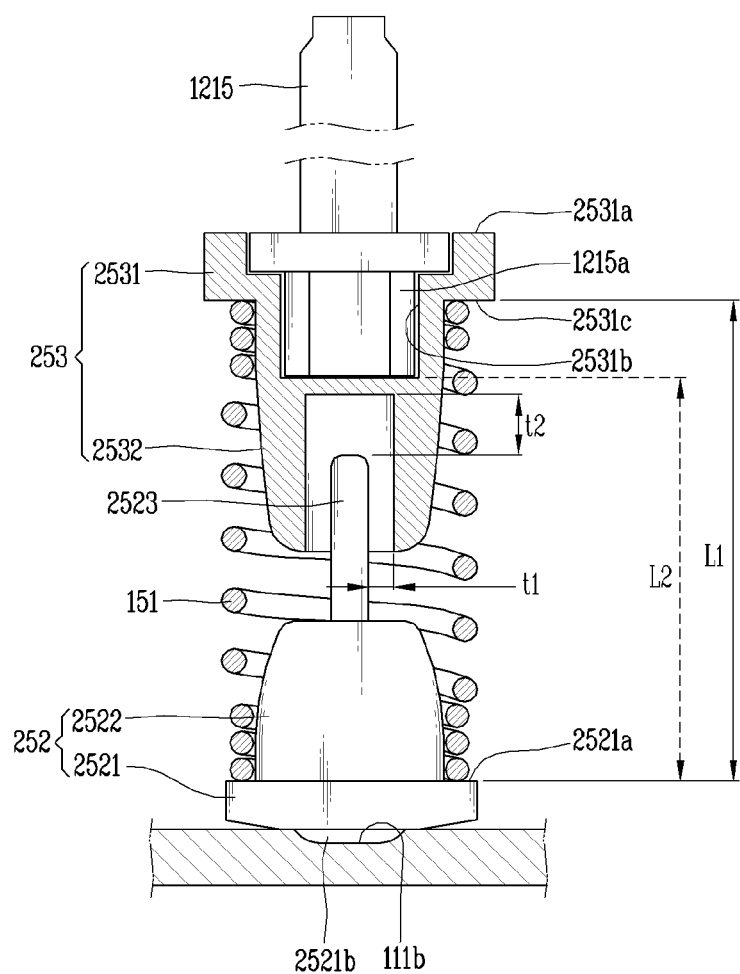
FIG. 11 is a cross-sectional view illustrating an assembled state of the support part in FIGS. 9 and 10.

FIGS. 9 and 10 are dissembled perspective views illustrating another embodiment of a support part viewed from above and below, respectively. FIG. 11 is a cross-sectional view illustrating an assembled state of the support part in FIGS. 9 and 10.

Referring to FIGS. 9 to 11, a first stopper cap 252 according to this embodiment may include a first spring support portion 2521, a stopper body portion 2522, and a stopper portion 2523. Accordingly, a stopper bar may extend from the first stopper cap 252 toward the compressor body C in this embodiment.

The first stopper cap 252, together with the first spring support portion 2521 and the stopper body portion 2522, may have a shape similar to the shape of the outer cap 152a of the embodiment in FIG. 6 described above. For instance, the first spring support portion 2521 may have a disk shape, and a cap support protrusion 2521b may be formed on a first cap fixing surface 2521a that defines a lower surface of the first spring support portion 2521 in the shape of a hemisphere. The cap support protrusion 2521b may protrude toward the cap fixing groove 111b formed on the cap mounting surface 111a of the base shell 111. The cap support protrusion 2521b may have various shapes, such as a hemispherical shape and an angular shape, for example.

An outer diameter of the first spring portion 2521 may be greater than or equal to an outer diameter of the support spring 151. Accordingly, a lower end of the support spring 151 which is externally fitted to a periphery of the stopper body portion 2522 may be supported by being in close contact with a first spring support surface 2521c defining an upper surface of the first spring support portion 2521 in the axial direction.

The stopper body portion 2522 that serves as a kind of spring insertion portion may have a circular bar (or rod) shape that extends from the first spring support surface 2521c of the first spring support portion 2521 along the axial direction. However, the stopper body portion 2522 may not be necessarily formed in the circular bar shape. For example, the stopper body portion 2522 may have an angular shape, such as a square bar, for example.

A lower half of the stopper body portion 2522 may have a constant outer diameter, whereas an upper half of the stopper body portion 2522 may have a truncated cone shape. For example, an outer diameter of the stopper body portion 2522 may be less than an inner diameter of the support spring 151. Accordingly, as the lower end of the support spring 151 is fitted to an outer circumferential surface of the stopper body portion 2522, the support spring 151 may be supported in the radial direction.

In addition, an upper surface of the stopper body portion 2522 may be closed so as to allow the stopper portion 2523 described hereinafter to extend therefrom. A stopper reinforcing portion 2524, which will be described hereinafter, may be provided between the upper surface of the stopper body portion 2522 and the stopper portion 2523.

However, in this example, by making the stopper body portion 2522 longer, the stopper body portion 2522 may serve as the stopper reinforcing portion 2524 without any separate stopper reinforcing portion. In this case, a total length of the first stopper cap 252 may be greater (longer) than a total length of the second stopper cap 253.

The stopper portion 2523 of this embodiment, which is a portion that corresponds to the stopper bar 154 of the embodiment in FIG. 6 described above, may axially extend from a central portion of an upper surface of the stopper body potion 2522 to the lower surface of the compressor body C. The stopper portion 2523 may have the same shape and dimension (or size) as the stopper bar 154 of the embodiment described above. A dimension of the stopper portion 2523 will be described hereinafter together with the second stopper cap 253.

Figure 12:
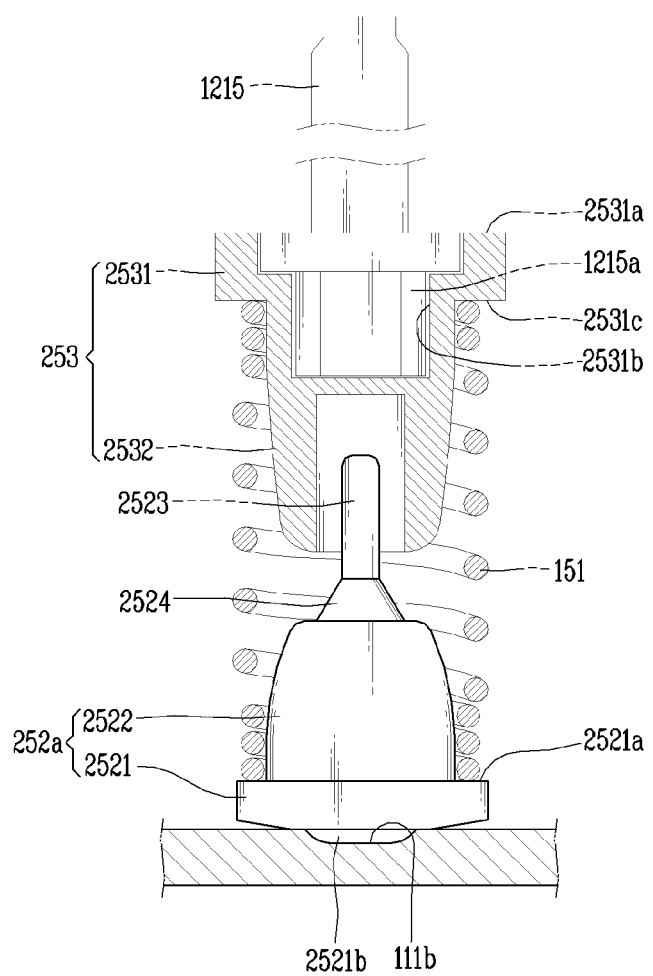
FIG. 12 is a cross-sectional view of a stopper portion according to another embodiment.

The stopper reinforcing portion 2524 may be further provided at a lower end of the stopper portion 2523, namely, a part or portion at which the stopper portion 2523 extends from the stopper body portion 2522. FIG. 12 is a cross-sectional view of a stopper portion according to another embodiment.

The stopper reinforcing portion 2524 of this embodiment may have an outer diameter smaller than an outer diameter of an upper end of the stopper body portion 2522 but larger than an outer diameter of the stopper portion 2523, for example. The stopper reinforcing portion 2524 may have a constant outer diameter, however, in some embodiments, the reinforcing portion 2524 may have a truncated cone shape.

Like the stopper cap 153 of the embodiment in FIG. 6, the second stopper cap 253 of this embodiment may be inserted into the bolt head portion 1215a of the stator fastening bolt 1215 to be coupled. For example, the second stopper cap 253 may include a second spring support portion (second spring support) 2531 and a stopper support portion (stopper support) 2532. The second stopper cap 253 may be made of an elastic material, for example, a rubber or plastic material. Accordingly, impact, generated when the stopper portion 2523 that serves as the stopper bar of the embodiment described above collides with the second stopper cap 253 may be attenuated by the stopper cap 253.

The second spring support portion 2531 may have a disk shape. An upper surface of the second spring support portion 2531, namely, a second cap fixing surface 2531a may be fixed to the compressor body C by being in close contact with the lower surface of the stator core 1211 defining the lower surface of the compressor body C.

In the second spring support portion 2531, a bolt insertion groove 2531b may be formed at a central portion of the second cap fixing surface 2531a. An inner circumferential surface of the bolt insertion groove 2531b may have an angular shape so as to correspond to an outer circumferential surface of the bolt head portion 1215a. Accordingly, the second stopper cap 253 may be insertedly coupled to the bolt head portion 1215a of the stator fastening bolt 1215 that penetrates through the stator core 1211.

A second spring support surface 2531c may be formed beneath a lower surface of the second spring support portion 2531. Like the first spring support surface 2521c, the second spring support surface 2531c may be formed in an annular shape along a circumference of the stopper support portion 2532 described hereinafter.

An outer diameter of the second spring support portion 2531 may be greater than or equal to an outer diameter of the support spring 151. Accordingly, an upper end of the support spring 151 which is externally fitted to a periphery of the stopper support portion 2532 described hereinafter may be supported by being in close contact with the second spring support surface 2531c formed beneath the lower surface of the second spring support portion 2531.

The second spring support surface 2531c may be symmetrical with the first spring support surface 2521c. For example, the second spring support surface 2531c may be parallel to the lower surface of the stator core 1211.

The stopper support portion 2532 may be symmetrical with the stopper body portion 2522 of the first stopper cap 252. For example, the stopper support portion 2532 may axially extend from a lower surface of the second spring support portion 2531, namely, from a central portion of the second spring support surface 2531c. The stopper support portion 2532 may have a hollow cylindrical shape so that an inside thereof defines a stopper accommodation groove 2532a.

An inner circumferential surface of the stopper support portion 2532 that defines the stopper accommodation groove 2532a may have a constant inner diameter in the axial direction, and an outer circumferential surface of the stopper support portion 2532 that serves as a kind of spring insertion portion may have a truncated cone shape whose outer diameter decreases toward the bottom. In addition, a lower surface of the stopper accommodation groove 2532a may be open so as to allow the stopper portion 2523 of the first stopper cap 252 to be inserted therein, and an upper surface of the stopper accommodation groove 2532a that forms a boundary with the bolt insertion groove 2532a is closed. That is, an inner circumferential surface of the stopper accommodation groove 2532a may be spaced apart from an outer circumferential surface of the stopper portion 2523 by a predetermined distance, and the upper surface of the stopper accommodation groove 2532a may be spaced apart from an upper end of the stopper portion 2523 by a predetermined distance. Accordingly, the inner circumferential surface of the stopper accommodation groove 2532a may define a radial support portion that supports the stopper portion 2523 in the radial direction (transverse direction), and the upper surface of the stopper accommodation groove 2532a may define an axial support portion that supports the stopper portion 2523 in the axial direction (longitudinal direction).

A first distance t1 between the inner circumferential surface of the stopper support portion 2532 and the outer circumferential surface of the stopper portion 2523, and a second distance t2 between an upper surface of the stopper support portion 2532 that defines the axial support portion and the upper end of the stopper portion 2523 may be equal to the first distance t1 and the second distance t2 of the embodiment in FIG. 6, respectively. Therefore, repetitive description thereof has been omitted.

As the operating effects of the support part of this embodiment are the same or similar to those of the previous embodiment, description thereof has been omitted. However, in this embodiment, as the stopper portion that serves as the stopper bar extends from the stopper cap which is fixed to the shell, a length of the stopper bar may be minimized. This may result in reducing buckling or bending of the stopper bar. In addition, as the stopper body portion of the second stopper cap is longer in length than the stopper support portion of the first stopper cap, a strength of the stopper portion may be further increased/reinforced.

Hereinafter, description will be given of a support part according to another embodiment. That is, in the embodiments described above, the stopper bar or the stopper cap is formed using the stator fastening bolt, but in some embodiments, the stopper bar or the stopper cap may be formed separately without using the stator fastening bolt.

Figure 13:
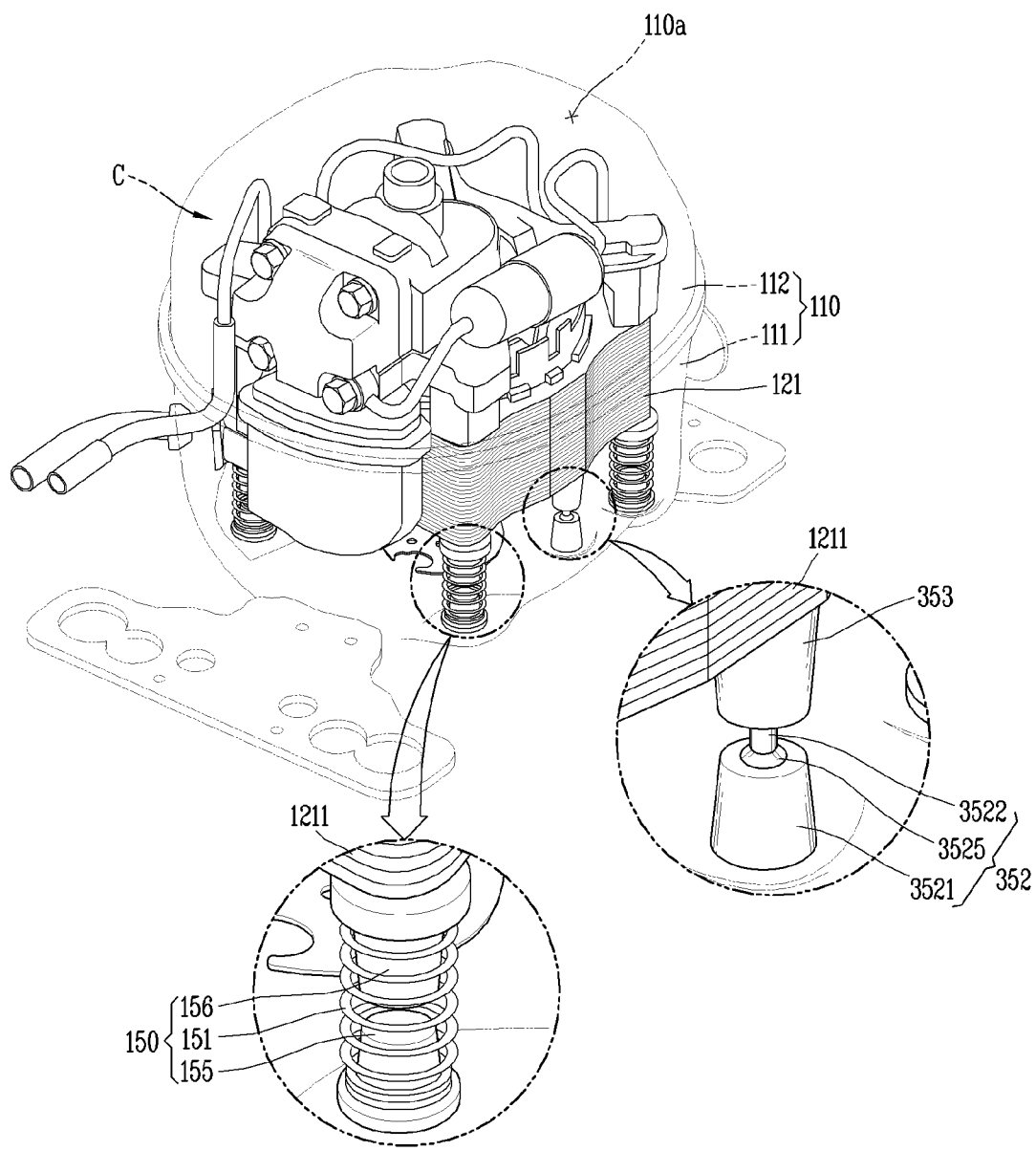
FIG. 13 is a see-through perspective view of a shell of a reciprocating compressor according to an embodiment for explaining another embodiment of a support.
Figure 14:
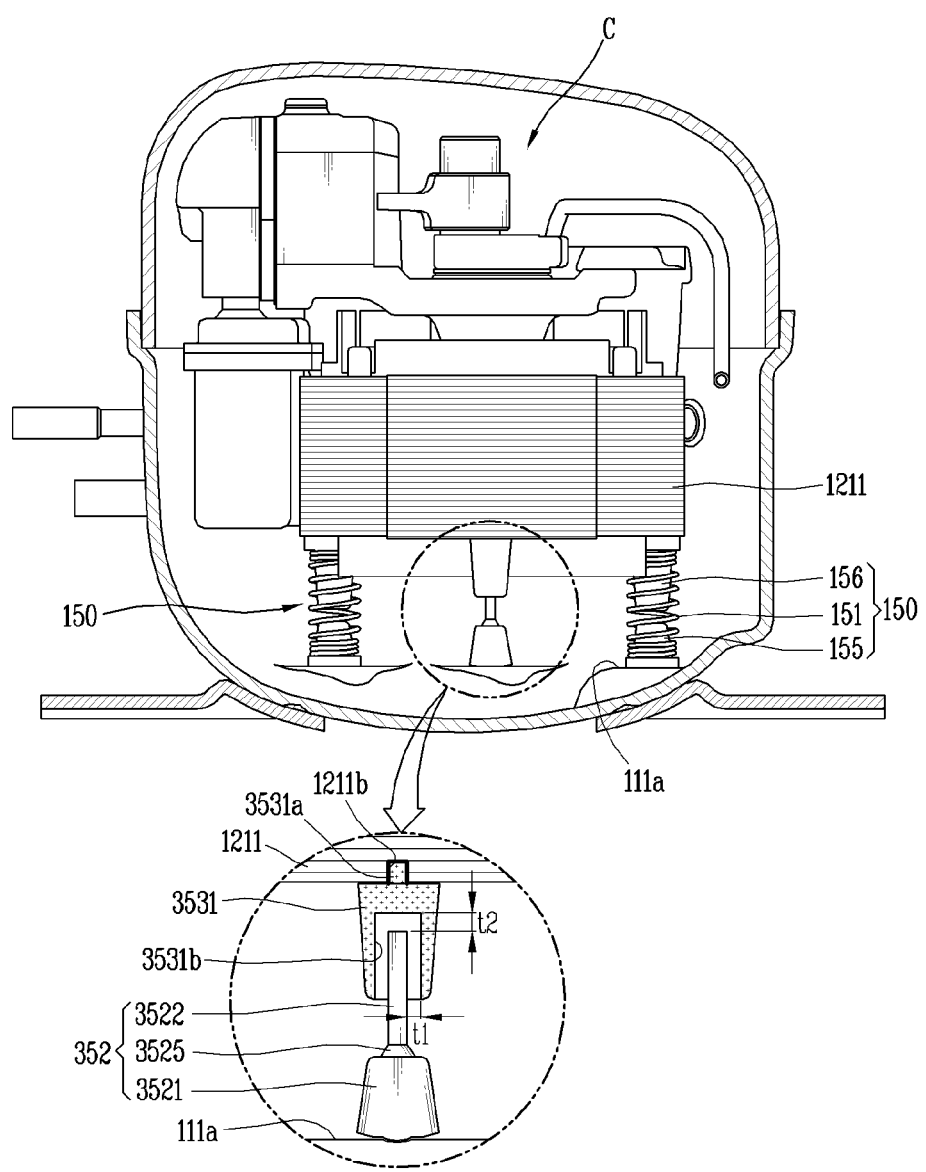
FIG. 14 is a cross-sectional view of an inside of the reciprocating compressor of FIG. 13.

FIG. 13 is a see-through perspective view of a shell of a reciprocating compressor according to another embodiment for explaining another embodiment of a support part. FIG. 14 is a cross-sectional view illustrating an inside of the reciprocating compressor according to FIG. 13.

Referring to FIGS. 13 and 14, first stopper cap 352 according to this embodiment is fixedly installed on the cap mounting surface 111a, which is the bottom surface of the base shell 111, as in the embodiment of FIG. 11, and a stopper portion 3522 that defines a stopper bar may axially extend from an upper surface of the first stopper cap 352.

For example, the first stopper cap 352 may be formed substantially similar to the first stopper cap 252 of the embodiment in FIG. 11. However, in this embodiment, as it is not necessary to couple the support spring 151 to the first stopper cap 352, the first spring support portion may be excluded from the first stopper cap 352.

That is, the first stopper cap 352 may include a stopper body portion 3521 and a stopper portion 3522. These stopper body portion 3521 and stopper portion 3522 may be the same as the stopper body portion 2522 and the stopper portion 2523 of the embodiment in FIG. 11, so repetitive description thereof has been omitted. However, in this embodiment, as it is not necessary to couple the support spring 151 to the first stopper cap 352, the first spring support surface may be excluded from the first stopper cap 352.

The second stopper cap 353 may be coupled to the lower surface of the stator core 1211, instead of being coupled to the bolt head portion 1215a of the stator fastening bolt 1215. For example, the second stopper cap 353 may be formed substantially similar to the second stopper cap 253 of the embodiment in FIG. 11. However, in this embodiment, as it is not necessary to couple the support spring 151 to the second stopper cap 353, the second spring support surface may be excluded from the second stopper cap 353.

More specifically, the second stopper cap 353 may include a stopper support portion 3531. A cap fixing protrusion 3531a may be formed on an upper surface of the stopper support portion 3531 so as to correspond to a cap fixing groove 1211b provided on the lower surface of the stator core 1211. As the second stopper cap 353, as a whole, is made of a material having elasticity, the cap fixing protrusion 3531a may have a shape like a conventional hook protrusion, allowing it to be elastically inserted into and coupled to the cap fixing groove 1211b of the stator core 1211. Accordingly, the second stopper cap 353 may be easily and firmly coupled to the stator core 1211 without welding.

The stopper support portion 3531 may extend in the axial direction to have a hollow cylindrical shape so as to define a stopper accommodation groove 3531b. However, the stopper support portion 3531 may not necessarily be formed in the cylindrical shape. For example, the stopper support portion 3531 may have an angular shape, such as a square cylinder, for example.

For example, the stopper accommodation groove 3531b may be formed such that a lower surface thereof is open and an upper surface thereof is closed. Accordingly, an inner circumferential surface of the stopper accommodation groove 3531b may define a radial support portion, whereas an upper surface of the stopper accommodation groove 3531b may define an axial support portion.

The inner circumferential surface of the stopper accommodation groove 3531b may be spaced apart from an outer circumferential surface of the stopper portion 3522 by a predetermined first distance t1, and the upper surface of the stopper accommodation groove 3531b may be spaced apart from an upper end of the stopper portion 3522 by a predetermined second distance t2. Descriptions of the first distance t1 and the second distance t2 may be the same as descriptions of embodiments described above.

As the stopper portion 3522 which is inserted into the stopper accommodation groove 3531b vibrates together with the compressor body C, the stopper portion 3522 may be brought into contact with the inner circumferential surface of the stopper accommodation groove 3531b that defines the radial support portion and the upper surface of the stopper accommodation groove 3531b that defines the axial support portion, which constrains the stopper portion 3522. This may allow radial displacement and axial displacement of the compressor body C to be limited.

As the effects of the support part of this embodiment is substantially similar to those of the embodiments described above, repetitive description thereof has been omitted. However, in this embodiment, the stopper bar and the stopper cap may be separately installed at positions that do not overlap the support spring. Accordingly, a separate or another stopper bar in addition to the stopper bar of the embodiment in FIG. 6 or 11 may be provided, allowing the compressor body to be more securely supported. In addition, an outer diameter of the stopper bar in this embodiment may be greater than an inner diameter of the support spring to thereby increase design freedom of the stopper bar.

Further, as for the support parts 150 that respectively support four corners of the stator core 1211, both ends of the support spring 151 may be fixedly installed at the stopper caps 155 and 156, respectively, as in the embodiment of FIG. 13 described above.

A stopper may not be separately provided at both stopper caps 155 and 156. However, in some cases, a stopper portion (not shown) may be provided at one of the stopper caps 155 and 156, and a stopper accommodation groove (not shown) may be formed on the other stopper cap so as to allow the stopper portion to be inserted therein. The stopper portion and the stopper accommodation groove may be the same as those of the example in FIG. 6 or 11, so repetitive description thereof has been omitted.

Embodiments disclosed herein provide a hermetic compressor capable of reducing vibration noise and increasing support stability of a compressor body that is elastically supported on a shell. Embodiments disclosed herein further provide a hermetic compressor capable of reducing transverse amplitude of a compressor body.

Embodiments disclosed herein also provide a hermetic compressor capable of mechanically limiting transverse amplitude of a compressor body. Additionally, embodiments disclosed herein provide a hermetic compressor capable of limiting transverse amplitude using an existing component or part without adding a separate component, thereby reducing vibration noise, increasing support stability and reducing manufacturing costs of the compressor, and achieving a smaller sized compressor.

Embodiments disclosed herein provide a hermetic compressor that may include a stopper bar provided at one of a shell or a compressor body facing the shell in a manner of extending in an axial direction, and a stopper that constrains the stopper bar and is provided at the remaining one. Accordingly, vibration noise of the compressor body may be reduced and support stability of the compressor body may be increased.

Embodiments disclosed herein provide a hermetic compressor that may include a first stopper and a second stopper respectively provided at a shell and a compressor body that faces the shell in an axial direction, and a stopper bar that penetrates through one of the first stopper or the second stopper or extends from one of the first stopper or the second stopper so as to be inserted into the remaining stopper with a predetermined allowable distance therebetween. This may allow transverse amplitude of the compressor body to be limited during stop/start, inclined operation, or transport of the compressor.

Embodiments disclosed herein provide a hermetic compressor that may include a first stopper axially extending from a shell or a compressor body; a second stopper provided at the compressor body or the shell to constrain the first stopper; and a support spring having both ends externally fitted to the first stopper and the second stopper, respectively, so as to support the compressor body on the shell. Accordingly, the compressor body may be stably supported on the shell without adding a separate component to thereby reduce manufacturing costs.

Embodiments disclosed herein also provide a hermetic compressor that may include a stopper bar extending from one end of a fastening member through which a stator core is fixed to a cylinder block, and a stopper cap having a cylindrical shape that has an inner diameter greater than an outer diameter of the first stopper so as to be fixed to the shell, and in which the first stopper is inserted so as to be supported in a radial direction. Accordingly, an additional component for fixing the compressor body to the shell may not be required. Further, as the stopper bar extends from the fastening member, an assembly strength of the compressor body may be increased, allowing the compressor body to be more securely supported.

Embodiments disclosed herein further provide a hermetic compressor that may include a first stopper cap to which one end of a support spring may be coupled and fixed to a compressor body, a second stopper cap to which another end of the support spring may be coupled and fixed to a shell, and a stopper bar that extends from one of the first stopper cap or the second stopper cap in a manner of penetrating through the support spring so as to be inserted into the remaining stopper cap to be axially and radially spaced apart by a predetermined distance. This may allow the compressor body to be supported on the shell and enable the compressor to be reduced in size, thereby achieving a smaller sized compressor.

Embodiments disclosed herein further provide a hermetic compressor that may include a shell that defines an outer appearance; a compressor body that is spaced apart from an inner surface of the shell and includes a motor unit and a compression unit; a support spring that is provided between the shell and the compressor body, and elastically supports the compressor body with respect to the shell; a stopper cap that is fixed to the inner surface of the shell or the compressor body facing the inner surface of the shell; and a stopper bar that extends from the compressor body or the inner surface of the shell facing the compressor body so as to be inserted into the stopper cap with a predetermined distance therebetween. Accordingly, it is possible to mechanically constrain amplitude of the compressor body with respect to the shell to thereby prevent the compressor body from being in contact with the shell.

The motor unit may be provided with a stator that is fixed to the compression unit by a stator fastening member, and the stopper bar may extend from the stator fastening member toward a first stopper cap that is fixed to the shell. This may allow the stopper bar to be easily formed without adding a separate component.

A bolt head portion (bolt head) may be formed at an end of the stator fastening member. The stopper bar may integrally extend from the bolt head portion.

The stopper bar may be provided with a stopper reinforcing portion formed at a portion that extends from the bolt head portion, and an outer diameter of the stopper reinforcing portion may be less than or equal to an outer diameter of the bolt head portion and greater than or equal to an outer diameter of the stopper bar. This may allow a strength of the stopper bar to be increased to thereby prevent the stopper bar from being buckled or bent.

The first stopper cap may be provided with a stopper support portion (stopper support) in which the stopper bar is inserted, the stopper support portion may be provided therein with a stopper accommodation groove having one end facing the compressor body open, and the stopper accommodation groove may have another end facing an end of the stopper bar closed. Accordingly, the stopper bar and the stopper cap may be constrained to each other in transverse and longitudinal directions.

The first stopper cap may include an outer cap that defines the stopper accommodation groove and is fixed to the shell and an inner cap that is inserted into the stopper accommodation groove of the outer cap. The inner cap may be made of a material having a rigidity lower than rigidity of the outer cap. This may allow impact between the stopper bar and the stopper cap to be buffered.

A second stopper cap may be insertedly coupled to an end of the stator fastening member, and the stopper bar may extend toward the first stopper cap by penetrating through the second stopper cap. This may allow the stopper bar to be formed inside a structure that supports the support spring, thereby supporting the compressor in a more stable manner and reducing the compressor in size.

The first stopper cap may be provided with a first spring support portion (first spring support), and the second stopper cap may be provided with a second spring support portion (second spring support). One or a first end of the support spring may be externally fitted to the first stopper cap in an inserted manner to be supported by the first spring support portion, and another or a second end of the support spring may be externally fitted to the second stopper cap in an inserted manner to be supported by the second spring support portion. An inner diameter of the support spring may be greater than the outer diameter of the stopper bar, so as to allow the stopper bar to be accommodated in the support spring.

A first stopper cap may be fixed to the shell, a second stopper cap may be fixed to the compressor body, and the stopper bar may extend from the first stopper cap toward the second stopper cap. This may allow the member that includes the stopper bar to be reduced in length, thereby preventing deformation or damage of the stopper bar.

The motor unit may be provided with a stator that is fixed to the compression unit by a stator fastening member. The second stopper cap may be insertedly fixed to the stator fastening member.

The second stopper cap may be provided with a stopper accommodation groove in which the stopper bar is inserted. The stopper accommodation groove may be formed such that one or a first end facing the first stopper cap is open and another or a second end facing an end of the stopper bar is closed.

One end of the support spring may be externally fitted and fixed to the first stopper cap. Another end of the support spring may be externally fitted and fixed to the second stopper cap. An inner diameter of the support spring may be greater than an outer diameter of the stopper bar, so as to allow the stopper bar to be accommodated in the support spring.

A first stopper cap may be fixed to the shell, and a second stopper cap may be fixed to the compressor body. A plurality of the support spring may be provided, and the first stopper cap and the second stopper cap may be provided between two support springs neighboring in a circumferential direction. The stopper bar may extend from the first stopper cap or the second stopper cap toward the stopper cap at an opposite side thereof. This may allow a separate stopper bar to be installed at a position that does not overlap the support spring. As the stopper bar is separately provided, the compressor body may be more securely supported, and design freedom of the stopper bar may be increased.

The stopper bar may be inserted to be spaced apart from an inside of the stopper cap in radial and axial directions.

A radial distance between an outer circumferential surface of the stopper bar and an inner circumferential surface of the stopper cap facing the outer circumferential surface of the stopper bar may be less than or equal to a half of a value obtained by subtracting the outer diameter of the stopper bar from an inner diameter of the stopper cap, and an axial distance between an end surface of the stopper bar and an upper surface or lower surface of the stopper cap facing the end surface of the stopper bar may be less than or equal to a value obtained by subtracting a compressed length of the support spring from a normal length of the support spring. Accordingly, the stopper bar may be brought into contact with the stopper cap before the shell and the compressor body come in contact with each other, allowing the compressor body to be more securely supported.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hermetic compressor, comprising:
   a shell that defines an outer appearance of the hermetic compressor;
   a compressor body that is spaced apart from an inner surface of the shell and includes a motor unit and a compression unit;
   at least one support spring that is provided between the shell and the compressor body, and elastically supports the compressor body with respect to the shell;
   at least one stopper cap that is fixed to the inner surface of the shell or the compressor body facing the inner surface of the shell; and
   a stopper bar that extends from the compressor body and is inserted into the at least one support spring and into the at least one stopper cap with a predetermined distance therebetween, wherein the at least one stopper cap comprises a first stopper cap fixed to the shell, wherein the motor unit is provided with a stator that is fixed to the compression unit by a stator fastening member, and wherein the stopper bar extends from the stator fastening member toward the first stopper cap.

2. The hermetic compressor of claim 1, wherein the stopper bar is provided with a stopper reinforcing portion formed at a portion that extends from the stator fastening member, and wherein an outer diameter of the stopper reinforcing portion is less than or equal to an outer diameter of the stator fastening member and greater than or equal to an outer diameter of the stopper bar.

3. The hermetic compressor of 1, wherein the first stopper cap is provided with a stopper support portion in which the stopper bar is inserted, wherein the stopper support portion is provided therein with a stopper accommodation groove having a first end that faces the compressor body and which is open, and wherein the stopper accommodation groove has a second end that faces an end of the stopper bar which is closed.

4. The hermetic compressor of claim 3, wherein the first stopper cap comprises an outer cap that defines the stopper accommodation groove and is fixed to the shell, and an inner cap that is inserted into the stopper accommodation groove of the outer cap, and wherein the inner cap is made of a material having a rigidity lower than a rigidity of the outer cap.

5. The hermetic compressor of claim 1, wherein the at least one stopper cap further comprises a second stopper cap coupled to an end of the stator fastening member, and wherein the stopper bar extends toward the first stopper cap by penetrating through the second stopper cap.

6. The hermetic compressor of claim 5, wherein the first stopper cap is provided with a first spring support portion, and the second stopper cap is provided with a second spring support portion, and wherein a first end of the at least one support spring is externally fitted onto the first stopper cap to be supported by the first spring support portion, and a second end of the support spring is externally fitted onto the second stopper cap to be supported by the second spring support portion.

7. The hermetic compressor of claim 6, wherein an inner diameter of the at least one support spring is greater than an outer diameter of the stopper bar, so as to allow the stopper bar to be accommodated in the at least one support spring.

8. The hermetic compressor of claim 1, wherein the stopper bar is inserted into and spaced apart from an inside of the first stopper cap in a radial direction and an axial direction.

9. The hermetic compressor of claim 8, wherein a radial distance between an outer circumferential surface of the stopper bar and an inner circumferential surface of the first stopper cap facing the outer circumferential surface of the stopper bar is less than or equal to a half of a value obtained by subtracting the outer diameter of the stopper bar from an inner diameter of the first stopper cap, and wherein an axial distance between an end surface of the stopper bar and a lower surface of the first stopper cap facing the end surface of the stopper bar is less than or equal to a value obtained by subtracting a compressed length of the at least one support spring from a normal length of the at least one support spring.

10. A hermetic compressor, comprising:
    a shell that defines an outer appearance of the hermetic compressor;
    a compressor body that is spaced apart from an inner surface of the shell and includes a motor and a compression unit including a piston driven by the motor to move relative to a cylinder block;

a plurality of support springs that is provided between the shell and the compressor body, and elastically supports the compressor body with respect to the shell;

first and second stopper caps provided for each of the plurality of support springs and fixed to the inner surface of the shell and the compressor body facing the inner surface of the shell, respectively; and a stopper bar that extends from the compressor body or the inner surface of the shell facing the compressor body and is inserted into a respective support spring of the plurality of support springs and into one of the first and second stopper caps with a predetermined distance therebetween, wherein the stopper bar is inserted into and spaced apart from an inside of the respective stopper cap in a radial direction and an axial direction, wherein a radial distance between an outer circumferential surface of the stopper bar and an inner circumferential surface of the respective stopper cap facing the outer circumferential surface of the stopper bar is less than or equal to a half of a value obtained by subtracting the outer diameter of the stopper bar from an inner diameter of the respective stopper cap, and wherein an axial distance between an end surface of the stopper bar and an upper surface or a lower surface of the respective stopper cap facing the end surface of the stopper bar is less than or equal to a value obtained by subtracting a compressed length of the respective support spring from a normal length of the respective support spring.

* * * * *